(12) United States Patent
Tu et al.

(10) Patent No.: US 8,926,099 B2
(45) Date of Patent: Jan. 6, 2015

(54) PHOSPHOR WHEEL AND ILLUMINATION SYSTEM WITH THE SAME

(75) Inventors: Huai-Ming Tu, Taoyuan Hsien (TW); Lai-Chang Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 200 days.

(21) Appl. No.: 13/617,593

(22) Filed: Sep. 14, 2012

(65) Prior Publication Data

US 2013/0308293 A1 Nov. 21, 2013

(30) Foreign Application Priority Data

May 18, 2012 (TW) .............................. 101117780 A (51) Int. Cl.
G03B 21/00 (2006.01)
(52) U.S. Cl.
USPC ...................... 353/31; 353/7; 353/94; 353/95
(58) Field of Classification Search
USPC ............. 353/7, 30, 31, 37, 38, 94, 95, 98, 99; 348/743–747, 759, E5.139; 362/293, 362/284, 332, 84, 231; 349/5, 7–9
See application file for complete search history.

(56) References Cited

U.S. PATENT DOCUMENTS

| | | | |
|---|---|---|---|
| 8,662,678 B2* | 3/2014 | Hirata et al. | 353/94 |
| 2009/0284148 A1* | 11/2009 | Iwanaga | 313/506 |
| 2011/0043764 A1* | 2/2011 | Narikawa | 353/31 |
| 2011/0149549 A1* | 6/2011 | Miyake | 362/84 |
| 2012/0188516 A1* | 7/2012 | Kashiwagi et al. | 353/31 |
| 2012/0201030 A1* | 8/2012 | Yuan et al. | 362/293 |
| 2012/0242912 A1* | 9/2012 | Kitano | 348/759 |
| 2012/0243205 A1* | 9/2012 | Lin | 362/84 |
| 2012/0249974 A1* | 10/2012 | Ogino | 353/38 |

FOREIGN PATENT DOCUMENTS

CN 202109406 1/2012

* cited by examiner

Primary Examiner — Sultan Chowdhury
(74) Attorney, Agent, or Firm — Kirton McConkie; Evan R. Witt (57) ABSTRACT

A phosphor wheel includes a glass, a first phosphor agent and a first filter. The glass has a first region and the first phosphor agent is coated on the first region for converting a first color light into a second color light. The first filter is disposed next to the first region for filtering at least a portion of the first color light and a first light beam of the second color light, so that a second light beam of the second color light is transmitted through the first filter. The second color light is yellow light, the first phosphor agent is yellow phosphor agent, and the first filter is a red light filter. The present invention achieves the advantages of decreasing the fabricating cost, increasing the brightness of the red light with increasing of driving current and the whole brightness of the illumination system, and improving the image quality.

15 Claims, 9 Drawing Sheets

PHOSPHOR WHEEL AND ILLUMINATION SYSTEM WITH THE SAME

FIELD OF THE INVENTION

The present invention relates to a wheel, and more particularly to a phosphor wheel. The present invention also provides an illumination system with such a phosphor wheel.

BACKGROUND OF THE INVENTION

In recent years, kinds of projectors are widely used in schools, homes and business occasions in order to amplify image signals provided by an image signal source and then display on a projection screen. For the purpose of reducing the power consumption and the size of devices, a solid-state light-emitting element is employed in the illumination system of current projector to replace the conventional high intensity discharge (HID) lamp.

Generally, the illumination system of the projector should emit three primary colors of light, i.e. red light (R), green light (G) and blue light (B). As for the luminous efficiency of the solid-state light-emitting element, the luminous efficiency of the blue solid-state light-emitting element is higher than the luminous efficiency of the red solid-state light-emitting element and the luminous efficiency of the green solid-state light-emitting element. Since the blue solid-state light-emitting element has better luminous efficiency, the red light and the green light are produced by using a blue solid-state light-emitting element and a wheel containing phosphor coating to excite blue light as red light or green light. That is, in replace of the red solid-state light-emitting element and the green solid-state light-emitting element, the uses of the blue solid-state light-emitting element and the wheel containing phosphor coating may directly emit the red light or the green light. Consequently, the luminous efficiency of the whole illumination system is enhanced.

Figure 1:
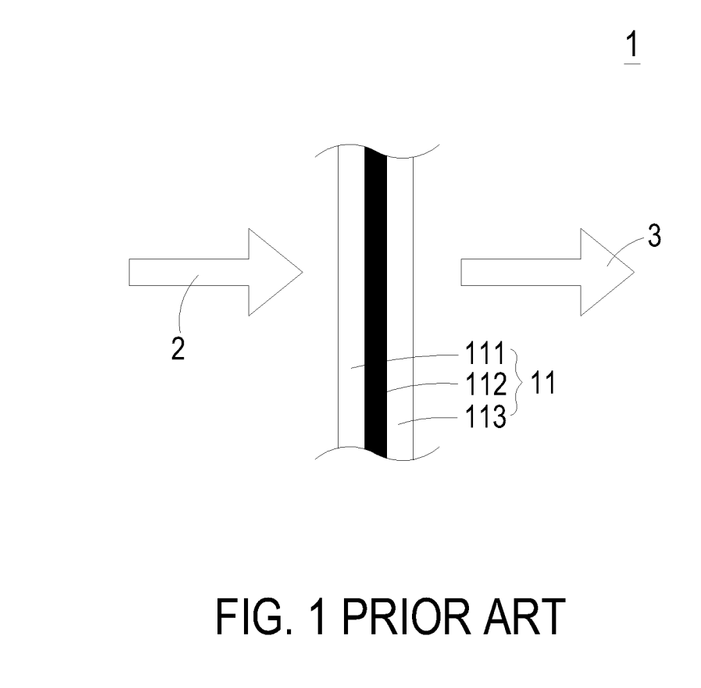
FIG. 1 schematically illustrates the configuration of a red phosphor agent segment of a conventional phosphor wheel.

For example, the phosphor wheel of current illumination system transforms and excites the blue light laser emitted by a blue solid-state light-emitting element into a red light with a red phosphor agent and a red light filter. FIG. 1 schematically illustrates the configuration of a red phosphor agent segment of a conventional phosphor wheel. The conventional phosphor wheel 1 of an illumination system includes a red phosphor agent segment 11, which comprises a glass 111, a red phosphor agent 112 and a red light filter 113. When emitted from the illumination system by a blue solid-state light-emitting element, the blue light 2 is transmitted through the glass 111 of the red phosphor agent segment 11 of the phosphor wheel 1 and projected on the red phosphor agent 112, which is coated on the glass 111, such that a red light 3 is emitted from the red phosphor agent 112 and transmitted to the red light filter 113 with the rest blue light 2. Simultaneously, the red light 3 is transmitted through the red light filter 113 and the rest blue light 2 is stop because of the characteristic of the red light filter 113.

However, the poor conversion efficiency of the red phosphor agent causes lower brightness of the red light output of the illumination system. In some conventional illumination systems, even though the color performance of the projector can be promoted by increasing the size of the red phosphor agent segment of the phosphor wheel, the brightness of the white light output of the whole illumination system will be too low to perform as a normal projector. At the same time, the overall fabricating cost of the projector will be increased due to the higher price of the red phosphor agent.

Figure 2:
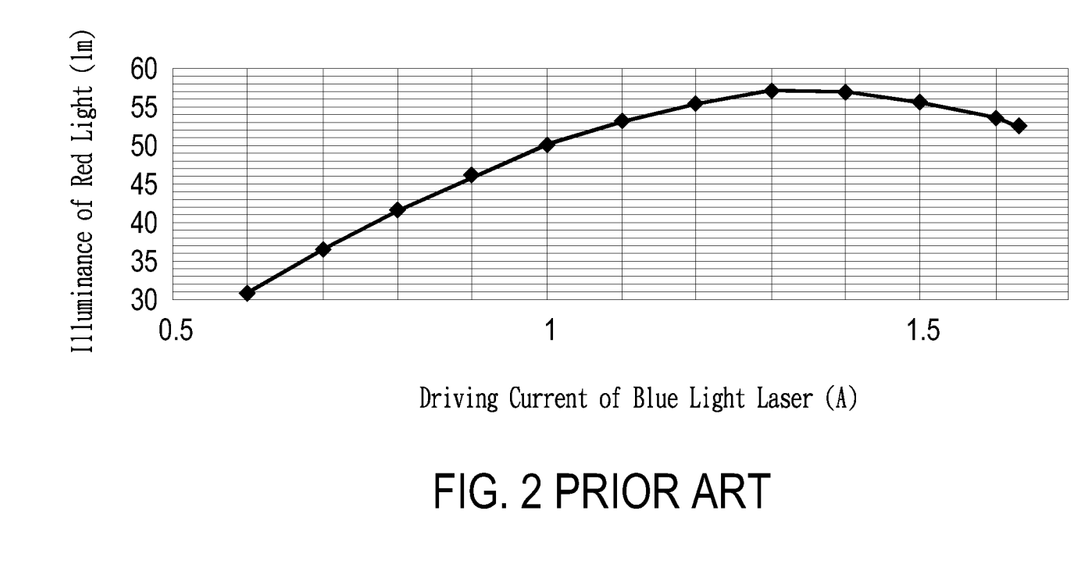
FIG. 2 schematically illustrates the corresponding graph of the driving current of the blue light laser of the conventional illumination system versus the illuminance of the red light.

Moreover, when the driving current of the blue light laser of the above-mentioned illumination system is larger, the luminance and the illuminance of the red light will decay. FIG. 2 schematically illustrates the corresponding graph of the driving current of the blue light laser of the conventional illumination system versus the illuminance of the red light. As shown in FIG. 2, when the driving current of the blue light laser rises up (e.g. more than 1.3 (A)), the illuminance of the red light decreases continuously. In other words, when the illuminance of the red light reaches a peak value, no matter how the driving current increases, the illuminance of the red light will be no longer increasing. Under this circumstance, the luminance and the illuminance will be too low so that the whole brightness cannot be integrated effectively, and further affects the sharpness and the contrast of color.

There is a need of providing an improved phosphor wheel and an illumination system with the same to obviate the drawbacks encountered from the prior art.

SUMMARY OF THE INVENTION

The present invention provides a phosphor wheel and an illumination system with such a phosphor wheel in order to eliminate the drawbacks caused by the poor illumination efficiency and the higher price of the red phosphor agent (e.g. high fabricating cost, low brightness and illuminance decay).

The present invention also provides a phosphor wheel and an illumination system with such a phosphor wheel. The phosphor wheel utilizes a yellow phosphor agent in replace of conventional red phosphor agent to reduce the fabricating cost, increase the brightness of the red light with the increasing of the driving current of the blue light laser, and further increase the whole brightness of the illumination system and improve the quality of the image projected.

The present invention further provides a phosphor wheel and an illumination system with such a phosphor wheel. Via the yellow phosphor agent and the red light filter, the red light having higher brightness may be generated by the phosphor wheel having smaller red region. As a result, the phosphor wheel may be designed to have larger blue region, green region and yellow region so as to be applied to the active 3D image-projection technology.

In accordance with an aspect of the present invention, there is provided a phosphor wheel. The phosphor wheel comprises a glass, a first phosphor agent and a first filter. The glass has a first region. The first phosphor agent is coated on the first region. By the first phosphor agent, a first color light in a first waveband region is excited as a second color light in a second waveband region. The first filter is disposed next to the first region of the glass and filtering at least a portion of the first color light and a first light beam of the second color light, so that a second light beam of the second color light is transmitted through the first filter so as to be outputted. Additionally, the second color light in the second waveband region is yellow light, the first phosphor agent is a yellow phosphor agent, and the first filter is a red light filter.

In accordance with another aspect of the present invention, there is provided an illumination system of a projector with active 3D image-projection technology. The illumination system comprises a solid-state light-emitting element and a phosphor wheel. The solid-state light-emitting element is used for emitting a first color light in a first waveband region to an optical path. The phosphor wheel is located at the optical path and comprises a glass, a first phosphor agent, a second phosphor agent, a first filter, a second filter, a third filter and a diffuser. The glass has a first region, a second region, a third region and a fourth region. The first phosphor agent is coated on the first region and the fourth region. By the first phosphor agent, the first color light is excited as a second color light in a second waveband region. The second phosphor agent is coated on the second region. By the second phosphor agent, the first color light is excited as a third color light in a third waveband region. The first filter is disposed next to the first region and filtering at least a portion of the first color light and a first light beam of the second color light, so that a second light beam of the second color light is transmitted through the first filter so as to be outputted. The second filter is disposed next to the second region and filtering at least a portion of the first color light, so that the third color light is transmitted through the second filter so as to be outputted. The third filter is disposed next to the fourth region and filtering at least a portion of the first color light, so that the second color light is transmitted through the third filter so as to be outputted. The diffuser is disposed next to the third region, so that the first color light is transmitted through the third region so as to be diffused and outputted. Furthermore, the second color light in the second waveband region is yellow light, the first phosphor agent is a yellow phosphor agent, the first filter is a red light filter, the degree of the central angle corresponding to the fourth region is more than or equal to 87 degrees, and the sum of degree of central angles, which are corresponding to the first region, the second region, the third region and the fourth region, respectively, is 360 degrees.

In accordance with another aspect of the present invention, there is provided an illumination system. The illumination system comprises a solid-state light-emitting element and a phosphor wheel. The solid-state light-emitting element is used for emitting a first color light in a first waveband region to an optical path. The phosphor wheel is located at the optical path and comprises a glass, a phosphor agent and a filter. The glass has a first region. The phosphor agent is coated on the first region. By the phosphor agent, the first color light in the first waveband region is excited as a second color light in a second waveband region. The filter is disposed next to the first region of the glass and filtering at least a portion of the first color light and a first light beam of the second color light, so that a second light beam of the second color light is transmitted through the filter so as to be outputted. In addition, the second color light in the second waveband region is yellow light, the phosphor agent is a yellow phosphor agent, and the filter is a red light filter.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
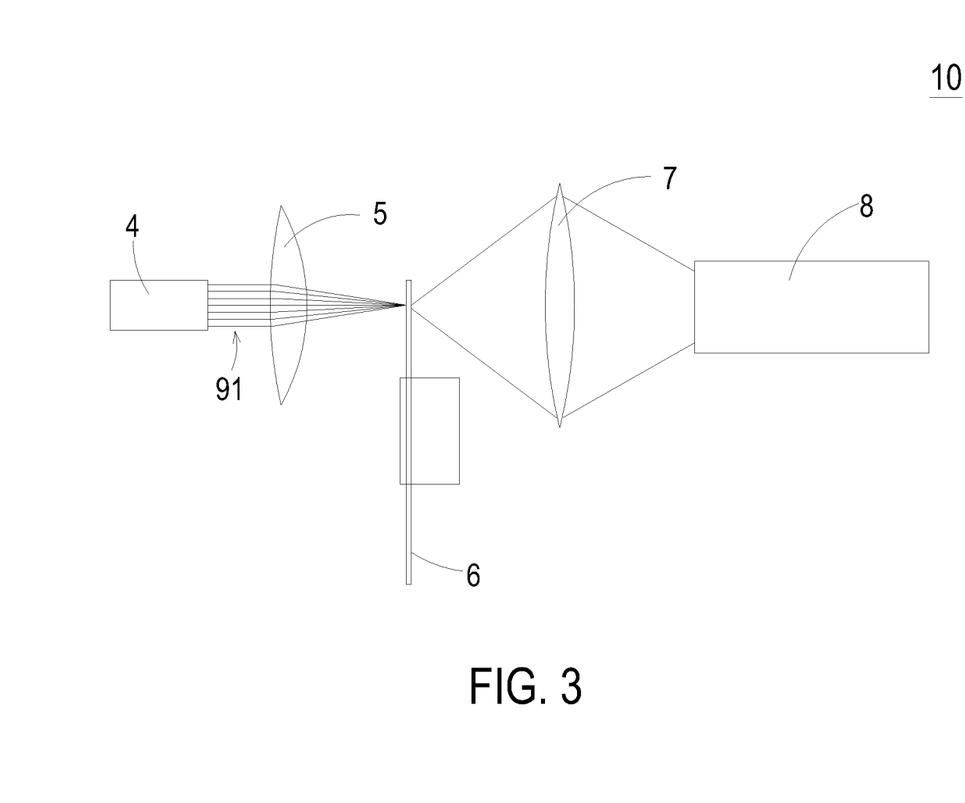
FIG. 3 schematically illustrates the architecture of an illumination system according to an embodiment of the present invention.
Figure 4:
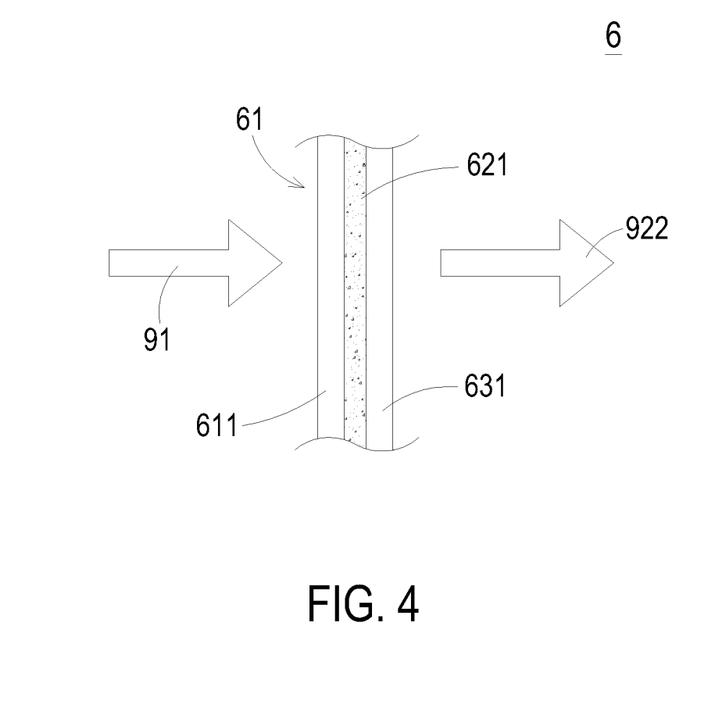
FIG. 4 schematically illustrates a portion of the exemplary phosphor wheel used in the illumination system as shown in FIG. 3.

Please refer to FIGS. 3 and 4. FIG. 3 schematically illustrates the architecture of an illumination system according to an embodiment of the present invention. FIG. 4 schematically illustrates a portion of the exemplary phosphor wheel used in the illumination system as shown in FIG. 3. The illumination system 10 of the present invention comprises a solid-state light-emitting element 4, a first relay module 5, a phosphor wheel 6, a second relay module 7 and an illumination path 8. An example of the solid-state light-emitting element 4 includes but is not limited to a blue light laser element or a blue light-emitting diode. The solid-state light-emitting element 4 is used for emitting a first color light 91 in a first waveband region to an optical path. The first relay module 5 is located between the solid-state light-emitting element 4 and the phosphor wheel 6. To be emitted to the optical path, the incident first color light 91 is transmissible through the first relay module 5 and focused on the phosphor wheel 6, such that a more divergent light excited by the phosphor wheel 6 is emitted to and transmissible through the second relay module 7, and is finally focused on the illumination path 8 of the illumination system 10 to complete the image-projection.

In this embodiment, the phosphor wheel is located at the optical path and comprises a glass 61, a first phosphor agent 621 and a first filter 631. The glass 61 has a first region 611. The first phosphor agent 621 is a yellow phosphor agent and coated on the first region 611 of the glass 61. By the first phosphor agent 621, the first color light 91 in the first waveband region is excited as a second color light in a second waveband region. For example, the blue light is excited as the yellow light, which means that the second color light in the second waveband is preferably yellow light. The first filter 631 is a red light filter disposed next to the first region 611 of the glass 61 and filtering at least a portion of the first color light 91 (e.g. rest of the first color light) and a first light beam of the second color light, so that a second light beam 922 of the second color light is transmitted through the first filter 631 so as to be outputted. Preferably, the first light beam is green light and the second light beam is red light. In some embodiments, rest of the blue light and the green light of the yellow light are filtered, such that the red light of the yellow light is transmitted through the first filter 631 so as to be outputted, but not limited thereto. Due to the utilization of the yellow phosphor agent and the red light filter, the overall fabricating cost will be reduced effectively, the brightness of the red light will be increased with the increasing of the driving current of the blue light laser, and the whole illuminance and image quality of the illumination system will be promoted.

Figure 5:
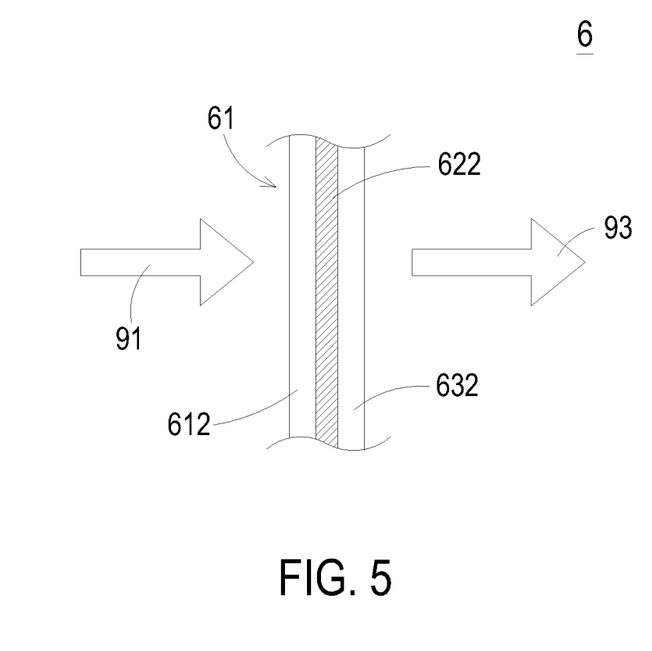
FIG. 5 schematically illustrates another portion of the exemplary phosphor wheel used in the illumination system as shown in FIG. 3.

FIG. 5 schematically illustrates another portion of the exemplary phosphor wheel used in the illumination system as shown in FIG. 3. As shown in FIG. 5, the phosphor wheel 6 of the present invention further comprises a second phosphor agent 622 and a second filter 632. The second phosphor agent 622 is coated on a second region 612 of the glass 61. By the second phosphor agent 622, the first color light 91 in the first waveband region is excited as a third color light 93 in a third waveband region. For example, the second phosphor agent 622 is a green phosphor agent, the first color light 91 in the first waveband region is blue light, and the third color light 93 in the third waveband region is green light, which means that the blue light is excited as the green light by the green phosphor agent but not limited thereto. The second filter 632 is not limited to a green light filter, disposed on the second region 612 of the glass 61 and filtering as least a portion of the first color light 91 (e.g. rest of the first color light), so that the third color light 93 is transmitted through the second filter 632 so as to be outputted. In some embodiments, rest of the blue light is filtered, such that the green light is transmitted through the second filter 632, which is preferably a green light filter, so as to be outputted.

Figure 6:
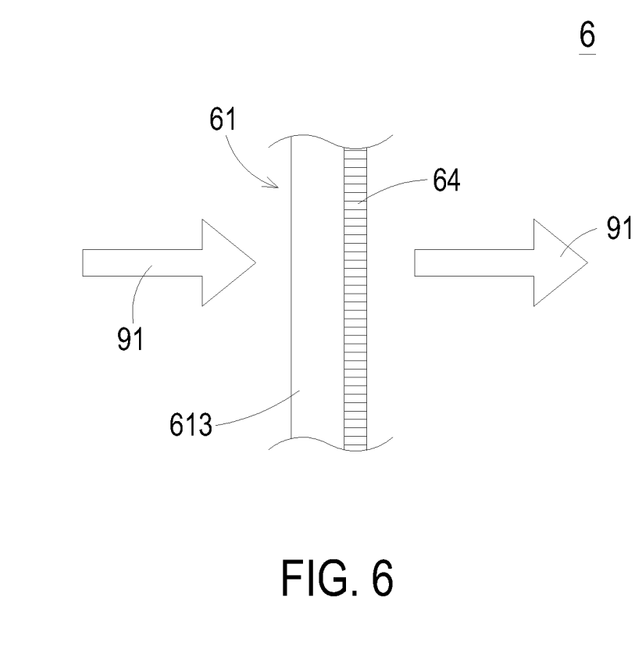
FIG. 6 schematically illustrates still another portion of the exemplary phosphor wheel used in the illumination system as shown in FIG. 3.

Please refer to FIG. 6, which schematically illustrates still another portion of the exemplary phosphor wheel used in the illumination system as shown in FIG. 3. The phosphor wheel 6 of the present invention further comprises a diffuser 64. The diffuser 64 is disposed next to a third region 613 of the glass 61 so that the first color light 91 in the first waveband region is transmitted through the third region 613 of the glass 61 so as to be diffused and outputted. For example, the first color light 91, which is preferably blue light, is transmitted through the third region 613 of the glass 61 and the diffuser 64, and then being diffused and outputted.

Figure 7:
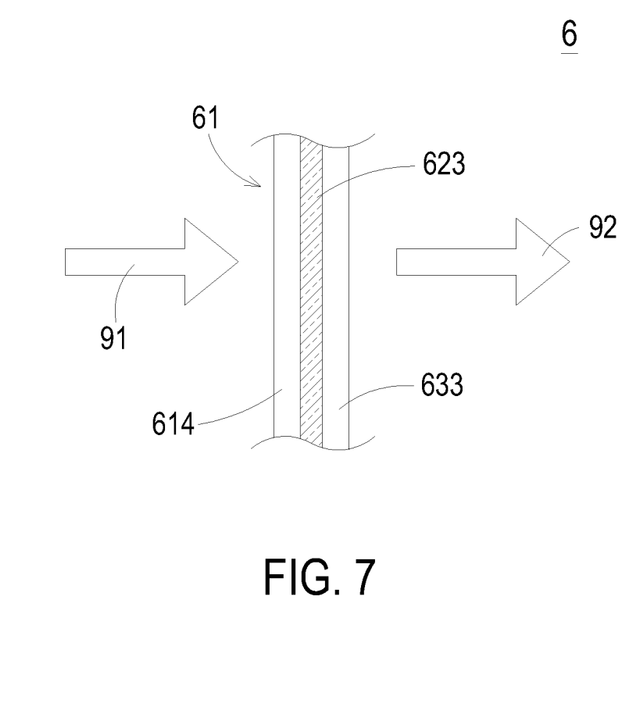
FIG. 7 schematically illustrates the other portion of the exemplary phosphor wheel used in the illumination system as shown in FIG. 3.

FIG. 7 schematically illustrates the other portion of the exemplary phosphor wheel used in the illumination system as shown in FIG. 3. As shown in FIG. 7, the phosphor wheel 6 of the present invention further comprises a third filter 633 disposed next to a fourth region 614 of the glass 61. An example of the third filter 633 includes but is not limited to a yellow light filter. The first phosphor agent 623 is also coated on the fourth region 614 of the glass 61. The first phosphor agent 623 is similar to that of the foresaid embodiment so that the first color light 91 is excited as the second color light 92 by the first phosphor agent 623. The third filter 633 is used for filtering at least a portion of the first color light 91 (e.g. rest of the first color light), so that the second color light 92 is transmitted through the third filter 633 so as to be outputted. For example, the blue light is excited as the yellow light by the yellow phosphor agent, rest of the blue light is filtered by the yellow light filter, and the yellow light is transmitted through the yellow light filter and being outputted, but not limited thereto.

Figure 8:
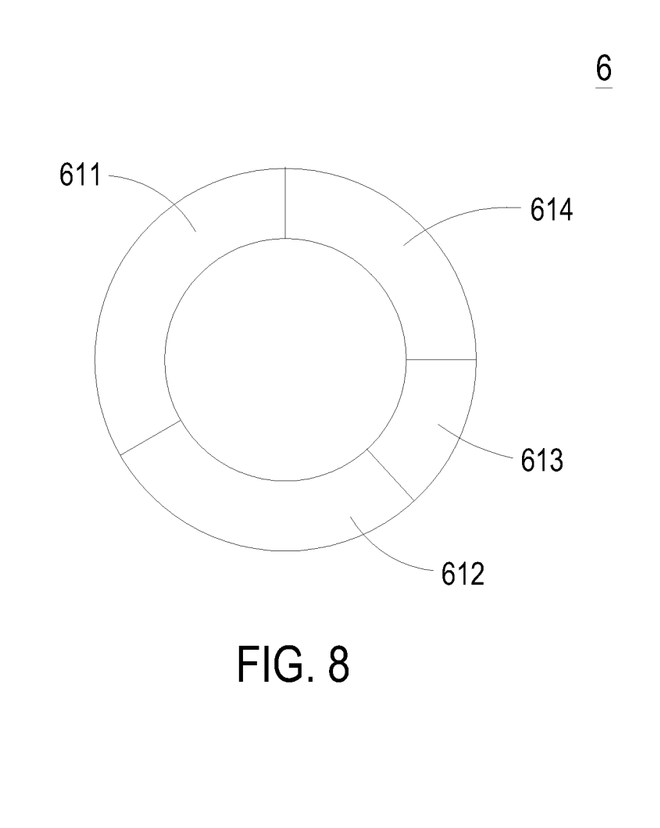
FIG. 8 schematically illustrates the architecture of a phosphor wheel according to an embodiment of the present invention.

Please refer to FIG. 8, which schematically illustrates the architecture of a phosphor wheel according to an embodiment of the present invention. As shown in FIG. 8, each of the first region 611, the second region 612, the third region 613 and the fourth region 614 has a central angle corresponding to the degree of the arc. The sum of the arcs of the first region 611, the second region 612, the third region 613 and the fourth region 614 is 360 degrees. In other words, the sum of degree of central angles, which are corresponding to the first region 611, the second region 612, the third region 613 and the fourth region 614, is 360 degrees, so that a complete circle of the phosphor wheel 6 is constituted.

In some embodiments, the degree of the arc of the first region 611 is more than the degree of the arc of the second region 612, which means that the degree of the central angle corresponding to the first region 611 of the glass 61 is more than the degree of the central angle corresponding to the second region 612 of the glass 610. Moreover, the degree of the arc of the second region 612 is more than twice the degree of the arc of the third region 613, which means that the degree of the central angle corresponding to the second region 612 is more than twice the degree of the central angle corresponding to the third region 613. In another embodiment, the degree of the arc of the third region 613 is less than the degree of the arc of the fourth region 614, which similarly means that the degree of the central angle corresponding to the third region 613 is less than the degree of the central angle corresponding to the fourth region 614.

Preferably, the degree of the arc of the fourth region 614 of the glass 61 of the phosphor wheel 6 of the present invention is more than or equal to 87 degrees. That is to say, the degree of the central angle corresponding to the fourth region 614 of the glass 61 is more than or equal to 87 degrees. Since the degree of the central angle of the fourth region 614, which emits the yellow light, is more than 87 degrees, the phosphor wheel 6 of the present invention satisfy the condition of active 3D image-projection technology. Therefore, the phosphor wheel 6 of the present invention is applied to an illumination system of a projector with active 3D image-projection technology. Via the yellow phosphor agent and the red light filter, the red light having higher brightness may be generated by the phosphor wheel having smaller red region. As a result, the phosphor wheel may be designed to have larger blue region, green region and yellow region so as to be applied to the active 3D image-projection technology.

Figure 9:
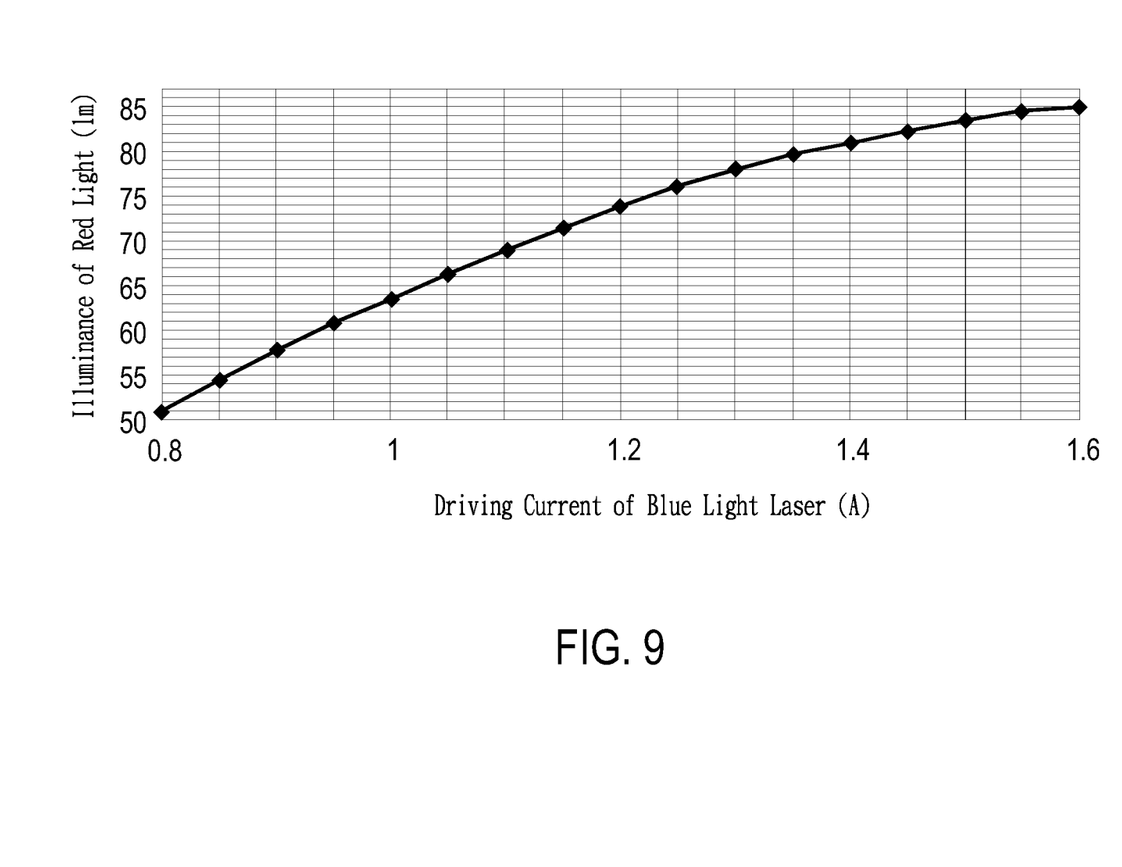
FIG. 9 schematically illustrates the corresponding graph of the driving current of the blue light laser of the illumination system of the present invention versus the illuminance of the red light.

FIG. 9 schematically illustrates the corresponding graph of the driving current of the blue light laser of the illumination system of the present invention versus the illuminance of the red light. By way of replacing the conventional red phosphor agent and red light filter with the yellow phosphor agent and red light filter of the phosphor wheel 6 of the illumination system 10 of the present invention, the phenomenon of illuminance decay, which occurs when the driving current is larger, can be avoided effectively. For example, when the driving current of the blue light laser is more than 1.3 (A), the illuminance of the red light rises up with the increasing of the driving current, and the driving current of the blue light laser and the illuminance of the red light have a positive linear correlation. Particularly, the positive linear correlation between the driving current of the blue light laser and the illuminance of the red light is about a direct proportion, but not limited thereto. To compare with the phosphor wheel of prior art (as shown in FIG. 2), the illuminance of the red light outputted by the phosphor wheel of the present invention is about 72 (lm), and the illuminance of the red light outputted by the phosphor wheel of prior art is about 55 (lm). That is, the illuminance of the red light can be promoted by 30 percent by the phosphor wheel 6 and the illumination system 10 of the present invention. Simultaneously, because the price of the yellow phosphor agent is far less than the price of the red phosphor agent, the overall fabricating cost is reduced.

From the above description, the present invention provides a phosphor wheel and an illumination system with such a phosphor wheel. The phosphor wheel utilizes a yellow phosphor agent in replace of conventional red phosphor agent to reduce the fabricating cost, increase the brightness of the red light with the increasing of the driving current of the blue light laser, and further increase the whole brightness of the illumination system and improve the quality of the image projected.

On the other hand, via the yellow phosphor agent and the red light filter, the red light having higher brightness may be generated by the phosphor wheel having smaller red region, such that the phosphor wheel may be designed to have larger blue region, green region and yellow region so as to be applied to the active 3D image-projection technology.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor wheel, comprising:
a glass having a first region, a second region, a third region and a fourth region, wherein the degree of the central angle corresponding to said fourth region is more than or equal to 87 degrees, and the sum of degree of central angles, which correspond to said first region, said second region, said third region and said fourth region, respectively, is 360 degrees;
a first phosphor agent coated on said first region and said fourth region, wherein a first color light in a first waveband region is excited as a second color light in a second waveband region by said first phosphor agent;
a first filter disposed next to said first region of said glass and filtering at least a portion of said first color light and a first light beam of said second color light, so that a second light beam of said second color light is transmitted through said first filter so as to be outputted; and
a second phosphor agent coated on said second region of said glass, wherein said first color light in said first waveband region is excited as a third color light in a third waveband region by said second phosphor agent;
wherein said second color light in said second waveband region is yellow light, said first phosphor agent is a yellow phosphor agent, said first filter is a red light filter, and said first color light in said first waveband region is transmitted through said third region of said glass.

2. The phosphor wheel according to claim 1 wherein said first color light in said first waveband region is blue light.

3. The phosphor wheel according to claim 1 wherein said first light beam of said second color light in said second waveband region is green light, and said second light beam of said second color light in said second waveband region is red light.

4. The phosphor wheel according to claim 1 further comprising a second filter, wherein said second filter is disposed next to said second region of said glass and filtering at least a portion of said first color light so that said third color light is transmitted through said second filter so as to be outputted.

5. The phosphor wheel according to claim 4 wherein said second phosphor agent is a green phosphor agent.

6. The phosphor wheel according to claim 4 further comprising a diffuser disposed next to said third region of said glass so that said first color light in said first waveband region is transmitted through said third region of said glass so as to be diffused and outputted.

7. The phosphor wheel according to claim 6 further comprising a third filter disposed next to said fourth region of said glass, wherein said third filter is filtering at least a portion of said first color light so that said second color light in said second waveband region is transmitted through said third filter so as to be outputted.

8. The phosphor wheel according to claim 7 wherein said first color light in said first waveband region is blue light and said third color light in said third waveband region is green light.

9. The phosphor wheel according to claim 7 wherein said second filter is a green light filter and said third filter is a yellow light filter.

10. The phosphor wheel according to claim 1 wherein the degree of the central angle corresponding to said first region of said glass is more than the degree of the central angle corresponding to said second region of said glass.

11. The phosphor wheel according to claim 1 wherein the degree of the central angle corresponding to said second region of said glass is more than twice the degree of the central angle corresponding to said third region of said glass.

12. The phosphor wheel according to claim 1 wherein the degree of the central angle corresponding to said third region of said glass is less than the degree of the central angle corresponding to said fourth region of said glass.

13. An illumination system of a projector with active 3D image-projection technology, comprising:
a solid-state light-emitting element for emitting a first color light in a first waveband region to an optical path; and
a phosphor wheel located at said optical path and comprising:
a glass having a first region, a second region, a third region and a fourth region;
a first phosphor agent coated on said first region and said fourth region, wherein said first color light is excited as a second color light in a second waveband region by said first phosphor agent;
a second phosphor agent coated on said second region, wherein said first color light is excited as a third color light in a third waveband region by said second phosphor agent;
a first filter disposed next to said first region and filtering at least a portion of said first color light and a first light beam of said second color light, so that a second light beam of said second color light is transmitted through said first filter so as to be outputted;
a second filter disposed next to said second region and filtering at least a portion of said first color light, so that said third color light is transmitted through said second filter so as to be outputted;
a third filter disposed next to said fourth region and filtering at least a portion of said first color light, so that said second color light is transmitted through said third filter so as to be outputted; and
a diffuser disposed next to said third region, so that said first color light is transmitted through said third region so as to be diffused and outputted,
wherein said second color light in said second waveband region is yellow light, said first phosphor agent is a yellow phosphor agent, said first filter is a red light filter, the degree of the central angle corresponding to said fourth region is more than or equal to 87 degrees, and the sum of degree of central angles, which are corresponding to said first region, said second region, said third region and said fourth region, respectively, is 360 degrees.

14. An illumination system, comprising:
a solid-state light-emitting element for emitting a first color light in a first waveband region to an optical path; and
a phosphor wheel located at said optical path and comprising:
a glass having a first region, a second region, a third region and a fourth region, wherein the degree of the central angle corresponding to said fourth region is more than or equal to 87 degrees, and the sum of degree of central angles, which are corresponding to said first region, said second region, said third region and said fourth region, respectively, is 360 degrees;

a phosphor agent coated on said first region and said fourth region, wherein said first color light in said first waveband region is excited as a second color light in a second waveband region by said phosphor agent; and a filter disposed next to said first region of said glass and filtering at least a portion of said first color light and a first light beam of said second color light, so that a second light beam of said second color light is transmitted through said filter so as to be outputted, wherein said second color light in said second waveband region is yellow light, said phosphor agent is a yellow phosphor agent, said filter is a red light filter, and said first color light in said first waveband region is transmitted through said third region of said glass.

15. The illumination system according to claim 14 wherein said solid-state light-emitting element is a blue light laser element or a blue light-emitting diode.

\* \* \* \* \*